United States Patent Office 2,965,488
Patented Dec. 20, 1960

2,965,488

RUMINANT FEED COMPOSITION

Irvin Joseph Belasco, Wilmington, Del., assignor to E. I. du Pont de Nemours and Company, Wilmington, Del., a corporation of Delaware No Drawing. Filed Apr. 7, 1959, Ser. No. 804,590

2 Claims. (Cl. 99—2)

This invention relates to improved ruminant feed compositions comprising urea, natural protein, carbohydrates and various additives.

Heretofore it has been proven that approximately two-fifths of the natural protein in ruminant feeds can be substituted by urea. Accordingly feed compositions have been developed, heretofore, wherein the principal ingredients comprise natural protein, urea, cellulosic material and other carbohydrates, and in some instances gluconeogenic additives such as sodium propionate.

An object of the invention is to improve the efficiency of feed compositions containing urea. Other objects will be apparent hereinafter.

It has been discovered in accordance with this invention that feed compositions containing natural protein, urea, cellulosic matter, other carbohydrates and minerals, and at least one member of the class consisting of water-soluble acetate and water-soluble propionate, are greatly improved by incorporating therein a further additive which consists of an insoluble, fine divided solid capable of absorbing ammonia resulting from proteolysis of proteinaceous material, hydrolysis of urea and degradation of aminoacids, peptides and other nitrogen containing materials in the paunch of ruminant animals.

The natural proteins which are employed in the practice of this invention may be varied rather widely and include linseed meal, cottonseed meal, soybean meal, and high protein seed meals generally. The amount of urea per unit of natural protein is generally 5% to 80%, on a nitrogen equivalency basis, preferably 20% to 40%. The quantity of cellulosic and other carbohydrate components can be varied over a very wide range, since they serve almost exclusively as a source of energy. Their fermentative end products serve as metabolic intermediates. A suitable content of carbohydrate (including cellulosic material) is usually from 5 to 50 times the weight of urea.

Suitable carbohydrates include cereal grains such as corn, barley, oats, millet, rice, wheat, milling products and by products such as wheat midds, wheat bran, gluten feeds, seed and grain hulls, corn cobs, and also sugars, molasses, starches, dextrins, pectins and the like.

The water-soluble acetates and propionates include the free acids and soluble salts thereof such as sodium propionate, sodium dipropionate, calcium propionates, and the corresponding acetates. The quantity of this addition should be about 0.05 to 20 times the weight of urea, preferably 0.1 to 2.0 times the weight of urea. Precursors for such materials may be introduced to supply the acetate or proprionate component. Suitable precursors for acetate or propionate include the higher fatty acids (above propionic), pyruvates, ethanol, acetaldehyde, hydroxybutyrate, glycerol, propylene glycol, glyceraldehyde, citrates, isocetrates, succinates, cis-aconitates, oxalosuccinates, alpha-ketoglutarates, fumarates, malates, oxaloacetates, lactates, glutamic acid, lysine, serine, methionine, threonine, valine, cysteine, phenylalanine, tyrosine, leucine, isoleucine; the esters, and amides can be used in place of sodium and calcium salts of the acids as sources of these precursor components.

The solid additive capable of absorbing ammonia is preferably a clay or clay-like material, including the various alumino silicates which are obtainable in nature in finely divided or even colloidal form. Suitable materials include attapulgites, kaolins, etc.; diatomaceous earths, hydrated silicas, cation-exchange resins, and other solid surfaces capable of retaining ammonia loosely, e.g. chemisorption. The weight ratio of this solid additive should be about 2% to 100%, preferably 5% to 50%, of the weight of urea.

One manner of practicing the invention is to feed beef cattle a supplement having the following composition.

| | Parts by weight |
|---|---|
| Ground barley | 800 |
| Crimped oats | 300 |
| Wheat bran | 200 |
| Soybean oil meal | 100 |
| Cane molasses | 200 |
| Corn gluten feed | 300 |
| Urea (42% N) | 36 |
| Sodium propionate | 18 |
| Finely divided attapulgite clay | 18 |
| Trace mineralized salt | 20 |
| Decalcium phosphate | 20 |

A feed supplement for dairy cattle is made of the following formula.

| | Parts by weight |
|---|---|
| Soybean oil meal | 300 |
| Cottonseed meal | 300 |
| Linseed meal | 300 |
| Wheat bran | 300 |
| Corngluten feed | 300 |
| Hominy | 200 |
| Cane molasses | 200 |
| Urea (42% N) | 70 |
| Sodium acetate | 70 |
| Kaolin | 35 |
| Trace mineralized salt | 40 |
| Dicalcium phosphate | 30 |

A finished feed mixture, suitable for dairy cattle and feed-lot diets for ruminants is prepared by grinding and mixing the following.

| | Parts by weight |
|---|---|
| Timothy hay | 955 |
| Dehydrated alfalfa | 42 |
| Yellow corn | 600 |
| Crimped oats | 300 |
| Soybean meal | 30 |
| Urea (42% N) | 40 |
| Calcium propionate | 40 |
| Colloidal attapulgite clay | 20 |
| Trace mineralized salt | 40 |
| Dicalcium phosphate | 30 |

The benefits of the present invention are observed when sheep and cattle are fed the mixtures herein disclosed. They can also be demonstrated by use of the rumen technique which has been developed during recent years, whereby the changes taking place in feeds, brought about by microorganisms, can be measured more readily and accurately. This technique involves the use of an apparatus in which the digestive processes of the animal are conducted and can be studied in vitro. By this means, various animal feeds are introduced into or withdrawn from the laboratory unit under carefully controlled conditions and the changes taking place studied critically and progressively during the consumption of the feed by the microorganisms.

In the examples which follow and which illustrate preferred embodiments of the invention, parts are by weight unless otherwise indicated.

*Example I*

Fermentations in vitro, with mixed cultures of rumen microorganisms were carried out in oil centrifuge tubes of 100 ml. capacity. All evaluations were run in triplicate. Each tube was charged with 0.5 gram of purified cellulose (Solka-Floc SW 40 A), 0.03 gram cane molasses ash, 0.1 gram of starch, varying amounts of urea, acetate, propionate, or their equivalents, and varying amounts of the various types of ammonia chemisorbents. In addition a nutrient salt solution was added providing the following to each tube.

|  | Grams |
|---|---|
| Monosodium phosphate | .0723 |
| Disodium phosphate | .0606 |
| Sodium bicarbonate | .1023 |
| Potassium chloride | .0145 |
| Sodium chloride | .0145 |
| Magnesium carbonate | .0017 |
| Sodium sulfate | .0083 |
| Calcium chloride | .0017 |
| Ferric chloride | .00245 |

Each tube was then inoculated with 25 ml. of strained and centrifuged steer rumen contents, collected before the morning feedings. The volume of the mixture was then adjusted to 50 ml. with distilled water and a drop of mineral oil was added to prevent frothing losses. The tubes were then placed in a 39° C. constant temperature bath and carbon dioxide bubbled through the system to maintain the necessary anaerobic conditions. After specified periods of fermentation, usually not exceeding 24 hours, the tubes were centrifuged and the supernatant fluid analyzed for residual ammonia and urea. The residue or undigested cellulose was also determined.

The tables which follow show the utilization quantities of ingredients replaced and the effect of these ingredients on the digestion of urea and cellulose, as well as on the formation of ammonia.

QUANTITIES USED

|  | 1 | 2 | 3 | 4 |
|---|---|---|---|---|
| Cellulose, g | 0.5 | 0.5 | 0.5 | 0.5 |
| Molasses ash, g | 0.03 | 0.03 | 0.03 | 0.03 |
| Nutrient Salt soln., ml | 15 | 15 | 15 | 15 |
| Starch, g | 0.1 | 0.1 | 0.1 | 0.1 |
| Urea, g | 0.080 | 0.080 | 0.080 | 0.080 |
| Sodium propionate, g |  |  | 0.040 | 0.040 |
| Attapulgite, g |  | 0.200 |  | 0.200 |
| Rumen inoculum, ml | 25 | 25 | 25 | 25 |
| $H_2O$ |  | dilute to 50 ml. |  |  |

RESULTS OF TEST

|  | 1 | 2 | 3 | 4 |
|---|---|---|---|---|
| Residual ammonia, percent | 0.0582 | 0.0536 | 0.0538 | .0485 |
| Urea (Consumed percent utilization), percent | 45.8 | 50.9 | 50.7 | 56.5 |
| Cellulose consumed percent (percent digestion) | 81.8 | 82.1 | 83.9 | 83.3 |

*Example II*

Example I was repeated using the compositions tabulated below.

QUANTITIES USED

|  | 1 | 2 | 3 | 4 |
|---|---|---|---|---|
| Cellulose, g | 0.5 | 0.5 | 0.5 | 0.5 |
| Molasses ash, g | 0.03 | 0.03 | 0.03 | 0.03 |
| Nutrient Salt soln., ml | 15 | 15 | 15 | 15 |
| Starch, g | 0.1 | 0.1 | 0.1 | 0.1 |
| Urea, g | 0.080 | 0.080 | 0.080 | 0.080 |
| Sodium acetate, g |  |  | 0.040 | 0.040 |
| Attapulgite, g |  | 0.200 |  | 0.200 |
| Rumen inoculum, ml | 25 | 25 | 25 | 25 |
| $H_2O$ |  | dilute to 50 ml. |  |  |

RESULTS OF TESTS

|  | 1 | 2 | 3 | 4 |
|---|---|---|---|---|
| Residual ammonia, percent | 0.0589 | 0.0584 | 0.0521 | 0.0467 |
| Urea utilization, percent | 55.0 | 55.4 | 63.7 | 69.8 |
| Cellulose digestion, percent | 87.4 | 85.9 | 86.9 | 87.1 |

*Example III*

Example I was repeated using the compositions tabulated below.

QUANTITIES USED

|  | 1 | 2 | 3 | 4 |
|---|---|---|---|---|
| Cellulose, g | 0.5 | 0.5 | 0.5 | 0.5 |
| Molasses ash, g | 0.03 | 0.03 | 0.03 | 0.03 |
| Nutrient Salt soln., ml | 15 | 15 | 15 | 15 |
| Starch, g | 0.1 | 0.1 | 0.1 | 0.1 |
| Urea, g | 0.080 | 0.080 | 0.080 | 0.080 |
| Sodium propionate |  |  | 0.040 | 0.040 |
| Diatomaceous earth, g |  | 0.200 |  | 0.200 |
| Rumen inoculum, ml | 25 | 25 | 25 | 25 |
| $H_2O$ |  | dilute to 50 ml. |  |  |

RESULTS OF TESTS

|  | 1 | 2 | 3 | 4 |
|---|---|---|---|---|
| Residual ammonia, percent | 0.0607 | 0.0555 | 0.0551 | 0.0528 |
| Urea utilization, percent | 48.5 | 54.8 | 54.9 | 63.5 |
| Cellulose digestion, percent | 79.7 | 81.4 | 79.0 | 78.7 |

In the foregoing examples it is to be noted that column 4 in each instance shows the benefit of employing propionate simultaneously with clay, columns 2 and 3 showing a much smaller benefit arising from the use of either propionate or clay without having both present together. Column 1 shows the poor result when both clay and propionate are omitted.

Similar effects were observed in a number of other runs, as tabulated below.

| Run | Major Nutrients | Fermentation Period, Hrs. | Percent Residual NH$_3$ | Percent Urea Utilization | Percent Cellulose Digestion |
|---|---|---|---|---|---|
| A | 0.5 g. cellulose +80 mg. urea | 5 | .0498 | 35.3 | 6.3 |
| A | 0.5 g. cellulose +80 mg. urea | 24 | .0556 | 57.9 | 81.0 |
| A | 0.5 g. cellulose +80 mg. urea +40 mg. Na propionate | 5 | .0480 | 46.9 | 8.5 |
| A | 0.5 g. cellulose +80 mg. urea +40 mg. Na propionate | 24 | .0421 | 75.4 | 84.5 |
| A | 0.5 g. cellulose +80 mg. urea +(40 mg. Na propionate) (100 mg. Natka clay [1]). | 5 | .0436 | 42.6 | 5.0 |
| A | 0.5 g. cellulose +80 mg. urea +(40 mg. Na propionate) (100 mg. Natka clay [1]). | 24 | .0413 | 77.4 | 84.9 |
| B | 0.5 g. cellulose +80 mg. urea | 5 | .0415 | 29.5 | 4.9 |
| B | 0.5 g. cellulose +80 mg. urea | 24 | .0458 | 71.4 | 83.9 |
| B | 0.5 g. cellulose +80 mg. urea +100 mg. Attaclay [2] | 5 | .0414 | 28.6 | 3.6 |
| B | 0.5 g. cellulose +80 mg. urea +100 mg. Attaclay [2] | 24 | .0420 | 75.5 | 84.5 |
| B | 0.5 g. cellulose +80 mg. urea +200 mg. Attaclay | 5 | .0384 | 35.9 | 2.1 |
| B | 0.5 g. cellulose +80 mg. urea +200 mg. Attaclay | 24 | .0399 | 76.7 | 82.6 |
| C | 0.5 g. cellulose +80 mg. urea | 24 | .0461 | 65.5 | 84.0 |
| C | 0.5 g. cellulose +80 mg. urea +40 mg. Na propionate | 24 | .0452 | 66.2 | 86.9 |
| C | 0.5 g. cellulose +80 mg. urea +(40 mg. Na propionate) (200 mg. Attaclay). | 24 | .0403 | 71.6 | 83.6 |
| D | 0.5 g. cellulose +80 mg. urea | 5 | .0284 | 24.7 | 6.3 |
| D | 0.5 g. cellulose +80 mg. urea +200 mg. Pharmasorb | 5 | .0297 | 24.9 | 3.2 |
| D | 0.5 g. cellulose +80 mg. urea +40 mg. Na propionate | 5 | .0251 | 34.4 | 7.5 |
| D | 0.5 g. cellulose +80 mg. urea +(200 mg. Pharmasorb[2]) (40 mg. Na propionate). | 5 | .0274 | 33.4 | 3.4 |
| E | 0.5 g. cellulose +80 mg. urea | 24 | .0582 | 45.8 | 81.8 |
| E | 0.5 g. cellulose +80 mg. urea +200 mg. Pharmasorb | 24 | .0536 | 50.9 | 82.1 |
| E | 0.5 g. cellulose +80 mg. urea +40 mg. Na propionate | 24 | .0538 | 50.7 | 83.9 |
| E | 0.5 g. cellulose +80 mg. urea +(200 mg. Pharmasorb) (40 mg. Na propionate). | 24 | .0485 | 56.5 | 83.3 |
| F | 0.5 g. cellulose +80 mg. urea | 24 | .0581 | 53.9 | 83.1 |
| F | 0.5 g. cellulose +80 mg. urea +200 mg. Pharmasorb C | 24 | .0512 | 61.6 | 80.6 |
| F | 0.5 g. cellulose +80 mg. urea +40 mg. Na propionate | 24 | .0575 | 56.8 | 84.9 |
| F | 0.5 g. cellulose +80 mg. urea +(200 mg. Pharmasorb C[2]) (40 mg. Na propionate). | 24 | .0500 | 64.9 | 82.5 |
| G | 0.5 g. cellulose +80 mg. urea | 24 | .0589 | 55.0 | 87.4 |
| G | 0.5 g. cellulose +80 mg. urea +200 mg. Pharmasorb | 24 | .0584 | 55.4 | 85.9 |
| G | 0.5 g. cellulose +80 mg. urea +40 mg. Na Acetate | 24 | .0521 | 63.7 | 86.9 |
| G | 0.5 g. cellulose +80 mg. urea +(200 mg. Pharmasorb) (40 mg. Na Acetate). | 24 | .0467 | 69.8 | 87.1 |
| H | 0.5 g. cellulose +80 mg. urea | 24 | .0607 | 48.5 | 99.7 |
| H | 0.5 g. cellulose +80 mg. urea +200 mg. Celite [3] | 24 | .0555 | 54.8 | 81.4 |
| H | 0.5 g. cellulose +80 mg. urea +40 mg. Na propionate | 24 | .0551 | 54.9 | 79.0 |
| H | 0.5 g. cellulose +80 mg. urea +(200 mg. Celite [3]) (40 mg. Na propionate) | 24 | .0528 | 53.5 | 73.7 |

[1] Natka clay—Aluminum silicate.
[2] Attaclay, Pharmasorb, Pharmasorb C—Aluminum magnesium silicate.
[3] Celite—Diatomaceous earth.

It is of course to be understood that the foregoing examples are illustrative rather than limitative and that the invention herein disclosed may be practiced by using other compositions within the scope of the disclosure herein above set forth.

I claim:

1. An improved ruminant feed composition comprising urea, clay, natural protein, carbohydrate, and at least one salt of the class consisting of the sodium and calcium salts of acetic and propionic acids, and characterized in that it gives rise to more efficient utilization of urea by rumen than a composition free of said clay and said salt, but containing the same quantities of each of said ingredients other than said clay and said salt, said improved ruminant feed composition containing from 5% to 80% of urea per unit weight of natural protein on a nitrogen equivalency, the quantity of carbohydrate being from 5 to 50 times the weight of urea, the quantity of said salt being from 0.05 to 20 times the weight of urea, the quantity of clay being from 2% to 100% of the weight of urea.

2. An improved ruminant feed composition comprising urea, clay, natural protein, carbohydrate, and at least one sodium salt of an acid of the class consisting of acetic and propionic acids, and characterized in that it gives rise to more efficient utilization of urea by rumen than a composition free of said clay and said salt, but containing the same quantities of each of said ingredients other than said clay and said salt, said improved ruminant feed composition containing from 5% to 80% of urea per unit weight of natural protein on a nitrogen equivalency, the quantity of carbohydrate being from 5 to 50 times the weight of urea, the quantity of said salt being from 0.05 to 20 times the weight of urea, the quantity of clay being from 2% to 100% of the weight of urea.

No references cited.